United States Patent
Gutz et al.

(10) Patent No.: US 10,302,020 B2
(45) Date of Patent: May 28, 2019

(54) SYSTEM AND METHOD FOR CONTROLLING A FUEL FLOW TO A GAS TURBINE ENGINE

(71) Applicant: General Electric Company, Schenectady, NY (US)

(72) Inventors: David Allen Gutz, Wenham, MA (US); Robert Edward Goeller, Beverly, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/375,547

(22) Filed: Dec. 12, 2016

(65) Prior Publication Data

US 2018/0163638 A1   Jun. 14, 2018

(51) Int. Cl.
*F02C 9/28* (2006.01)
*B64D 37/00* (2006.01)
*G05B 15/02* (2006.01)

(52) U.S. Cl.
CPC .............. *F02C 9/28* (2013.01); *B64D 37/005* (2013.01); *G05B 15/02* (2013.01); *F05D 2270/301* (2013.01); *F05D 2270/303* (2013.01); *F05D 2270/304* (2013.01); *F05D 2270/309* (2013.01)

(58) Field of Classification Search
None
See application file for complete search history.

(56) References Cited

U.S. PATENT DOCUMENTS 6,195,247 B1    2/2001  Cote et al.
8,311,579 B2   11/2012  Rofougaran et al.
8,327,117 B2   12/2012  Smilg et al.
8,965,288 B2    2/2015  Barnes et al.
8,989,921 B2    3/2015  Nannoni et al.
2013/0008171 A1*  1/2013  Djelassi ............... F02C 9/28
                                                           60/772
2016/0009377 A1   1/2016  Khalid

FOREIGN PATENT DOCUMENTS

EP    2441938 A1   4/2012

OTHER PUBLICATIONS

Wikipedia, Accelerometer, The Free Encyclopedia, https://en.wikipedia.org/wiki/Accelerometer, Jul. 18, 2016, 9 pages.

* cited by examiner

*Primary Examiner* — Hussein Elchanti
*Assistant Examiner* — Kyung J Kim
(74) *Attorney, Agent, or Firm* — Dority & Manning, P.A.

(57) ABSTRACT

A computer-implemented method for controlling a fuel flow to a gas turbine engine of an aircraft includes determining a control initiated fuel flow demand that is based, at least in part, on an operator command. In addition, the method includes determining a first rate of change of fuel flow demand based, at least in part, on a tracking error of the gas turbine engine that indicates a difference between a desired rotational speed and an actual rotational speed. The method also includes integrating the first rate of change of fuel flow demand to determine a tracking error fuel flow demand. In addition, the method includes summing the control initiated fuel flow demand and tracking error fuel flow demand to determine a composite fuel flow demand. The method also includes controlling a fuel flow to the gas turbine engine based, at least in part, on the composite fuel flow demand.

20 Claims, 6 Drawing Sheets

SYSTEM AND METHOD FOR CONTROLLING A FUEL FLOW TO A GAS TURBINE ENGINE

FIELD

The present subject matter relates generally to a system and method for controlling a fuel flow demand of a gas turbine engine.

BACKGROUND

A gas turbine engine generally includes, in serial flow communication, a gas generator compressor, a combustor, a gas generator turbine, and a power turbine. The combustor generates combustion gases that are channeled to the gas generator turbine where they are expanded to drive the gas generator turbine. Then, the combustion gases are channeled to the power turbine where they are further expanded to drive the power turbine. The gas generator turbine is coupled to the gas generator compressor via a gas generator shaft, and the power turbine is coupled to an output shaft via a power turbine shaft. The output shaft may be coupled to a load, such as main rotor blades of a helicopter.

Aircraft utilize an engine controller to determine an amount of fuel (e.g., fuel flow demand) the gas turbine engine needs in order to produce a desired power (thrust). In operation, the engine controller determines a tracking error between a reference speed of the gas turbine engine and an actual speed of the gas turbine engine. In modern FADEC systems, the tracking error represents a rate-based value, and the engine controller utilizes the tracking error to determine a rate of change of fuel flow demand. The engine controller then integrates the rate of change of fuel flow demand to determine an amount of fuel needed to produce the desired power. This approach provides integral control action and, as a result, provides superior error and bandwidth performance.

However, determining the fuel flow demand based on merely the tracking error is problematic, because loads enter the system as a disturbance on the powerplant (i.e., engine) during transient operation (e.g., acceleration, deceleration, etc.) of the aircraft. Disturbance rejection of this nature is very difficult to compensate without additional information. Thus, in an effort to improve operation of the aircraft during transient operation, the engine controller receives an operator command from an operator manipulated input device of the aircraft. The operator command represents a non-rate based value, and the engine controller utilizes the operator command to anticipate movement of the aircraft. However, as discussed below in more detail, FADEC systems cannot easily utilize the non-rate based operator command, because FADEC systems are rate-based systems.

More specifically, in operation, the engine controller utilizes both the tracking error and the operator command to determine the fuel flow demand of the aircraft, but the engine controller requires complex logic in order to merge the rate-based value (e.g., tracking error) with the non-rate based value (e.g., operator command). The complex logic, in addition to adding memory and computational load, is susceptible to forgetting the previous history and becoming confused so that governed speed is inconsistent. In addition, known methods for correcting these issues increase the complexity and require more memory, and therefore compound the problems.

Accordingly, a system and method for providing improved control of the fuel flow demand of a gas turbine engine of an aircraft would be welcomed in the technology. In particular, systems and methods that reduce the complexity of the logic utilized to determine the fuel flow demand would be beneficial.

BRIEF DESCRIPTION

Aspects and advantages of the invention will be set forth in part in the following description, or may be obvious from the description, or may be learned through practice of the invention.

In one exemplary embodiment, a computer-implemented method for controlling a fuel flow to a gas turbine engine of an aircraft includes determining, by one or more controllers, a control initiated fuel flow demand that is based, at least in part, on an operator command. The computer-implemented method may also include determining, by the one or more controllers, a first rate of change of fuel flow demand based, at least in part, on a tracking error of the gas turbine engine. The tracking error may indicate a difference between a desired rotational speed and an actual rotational speed. In addition, the computer-implemented method may include integrating, by the one or more controllers, the first rate of change of fuel flow demand to determine a tracking error fuel flow demand. The computer-implemented method may also include summing, by the one or more controllers, the control initiated fuel flow demand and tracking error fuel flow demand to determine a composite fuel flow demand. In addition, the computer-implemented method may include controlling, by one or more controllers, a fuel flow to the gas turbine engine based, at least in part, on the composite fuel flow demand.

In another exemplary embodiment, a system for controlling a fuel flow to a gas turbine engine of an aircraft may comprise one or more processors and one or more memory devices. The one or more memory devices may store computer-readable instructions that, when executed by the one or more processors, cause the one or more processors to determine a control initiated fuel flow demand based, at least in part, on an operator command. In addition, the computer-readable instructions may cause the one or more processors to determine a first rate of change of fuel flow demand based, at least in part, on a tracking error of the gas turbine engine. The tracking error may indicate a difference between a desired rotational speed and an actual rotational speed. In addition, the computer-readable instructions may cause the one or more processors to integrate the first rate of change of fuel flow demand to determine a tracking error fuel flow demand. The computer-readable instructions may also cause the one or more processors to sum the control initiated fuel flow demand and the tracking error fuel flow demand to determine a composite fuel flow demand. In addition, the computer-readable instructions may cause the one or more processors to control a fuel flow to the gas turbine engine based, at least in part, on the composite fuel flow demand.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary

DETAILED DESCRIPTION

Figure 1:
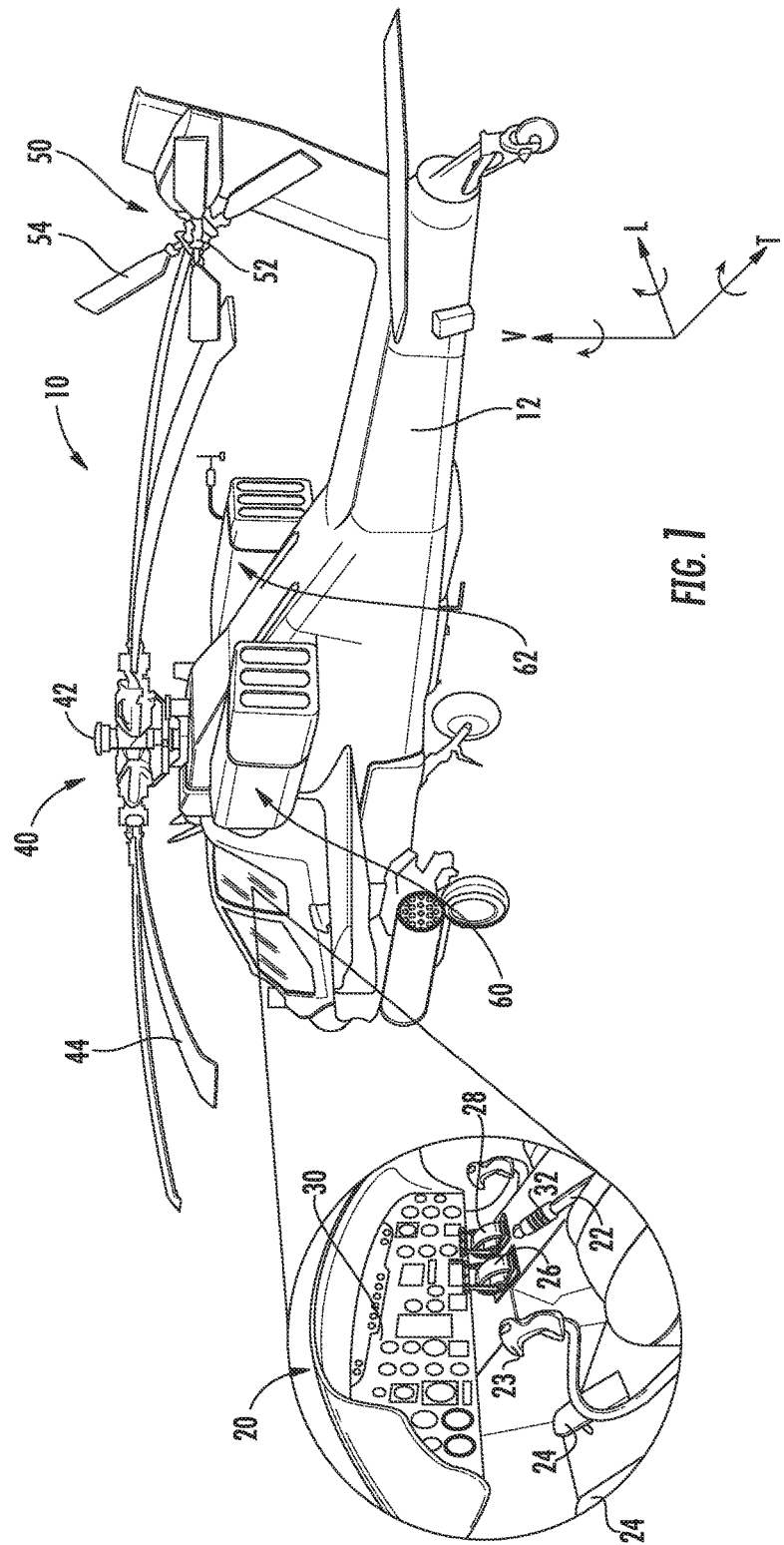
FIG. 1 is a perspective view of an aircraft in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one signal or component from another and are not intended to signify location or importance of the individual signals and/or components.

In general, the present subject matter is directed to an improved system and method for controlling a fuel flow of a gas turbine engine on an aircraft by more effectively utilizing a non-rate based operator command. Specifically, in accordance with aspects of the present subject matter, an engine controller of the gas turbine engine may be configured to adjust the fuel flow based, at least in part, on a non-rate based fuel signal and a rate based fuel signal. For example, the non-rate based fuel signal may be derived, at least in part, from an operator command received from an operator manipulated input device of the aircraft. Alternatively, the non-rate based fuel signal may be derived, at least in part, from motion sensor data received from a motion sensor (e.g., accelerometer, gyroscope, etc.) of the aircraft. The rate based fuel signal may be based, at least in part, on a tracking error indicating a difference between a desired rotational speed of the gas turbine engine and an actual rotational speed of the gas turbine engine. The system and method of the present subject matter may lessen the burden of merging the non-rate based signal and rate-based signal, and, as a result, may improve performance of the aircraft during transient operation (e.g., acceleration, deceleration, etc.).

FIG. 1 provides a perspective view of an exemplary aircraft 10 in accordance with the present disclosure. The aircraft 10 defines an orthogonal coordinate system, including three orthogonal coordinate axes. More specifically, the three orthogonal coordinate axes include a lateral axis L, a longitudinal axis T, and a vertical axis V. In operation, the aircraft 10 may move along or around at least one of the lateral axis L, the longitudinal axis T, and the vertical axis V.

In the embodiment illustrated in FIG. 1, the aircraft 10 includes an airframe 12 defining a cockpit 20. The cockpit 20 includes a collective pitch input device 22, a cyclic pitch input device 23, a tail rotor input device 24, a first throttle input device 26, a second throttle input device 28, and an instrument panel 30. The aircraft 10 further includes a main rotor assembly 40 and a tail rotor assembly 50. The main rotor assembly 40 includes a main rotor hub 42 and a plurality of main rotor blades 44. As shown, each main rotor blade 44 extends outwardly from the main rotor hub 42. The tail rotor section 50 includes a tail rotor hub 52 and a plurality of tail rotor blades 54. Each tail rotor blade 54 extends outwardly from the tail rotor hub 52.

Additionally, the aircraft 10 includes a first gas turbine engine 60 and a second gas turbine engine 62. The first and second gas turbine engines 60, 62 generate and transmit power to drive rotation of the main rotor blades 44 and the tail rotor blades 54. In particular, rotation of the main rotor blades 44 generates lift for the aircraft 10, while rotation of the tail rotor blades 54 generates sideward thrust at the tail rotor section 50 and counteracts torque exerted on the airframe 12 by the main rotor blades 44.

The collective pitch input device 22 adjusts the pitch angle of the main rotor blades 44 collectively (i.e., all at the same time) to increase or decrease the amount of lift the aircraft 10 derives from the main rotor blades 44 at a given rotor speed. More specifically, manipulating the collective pitch input device 22 causes the aircraft 10 to move in one of two opposing directions along the vertical direction V. It should be appreciated that manipulating the collective pitch input device 22 can also be used to anticipate the amount of power the first and second gas turbine engines 60, 62 provide the main rotor assembly 40 to generate the desired lift of the aircraft 10. In addition, the collective pitch input device 22 may include an input device 32 configured to set a reference speed for the first and second gas turbine engines 60, 62. In one exemplary embodiment, the input device 32 may be a switch configured to set the reference speed for both the first and second gas turbine engines 60, 62.

The cyclic pitch input device 23 controls movement of the aircraft 10 around the longitudinal axis T and around the lateral axis, L. In particular, the cyclic pitch input device 23 adjusts an angle of the aircraft 10 allowing the aircraft 10 to move forward or backwards along the longitudinal direction T or sideways in the lateral direction L. Additionally, the tail rotor input device 24 controls a pitch angle of the tail rotor blades 54. In operation, manipulating the tail rotor input device 24 may cause the tail rotor section 50 to move along the lateral direction L and thereby change the orientation of the aircraft 10.

The first and second throttle input devices 24, 26 are typically moved to a full on position at the start of a flight and kept in the full on position for the duration of the flight. For example, the first and second throttle input devices 24, 26 may be moved to a FLY position at the start of a flight and may remain in this position through the duration of the flight. In general, the gas turbine engines 60, 62 maintain a constant speed regardless of the power demand of the aircraft 10. So, for example, if an operator (e.g., a pilot) of the aircraft 10 changes the power demand of the aircraft 10 through manipulation of at least one of the collective pitch input device 22, the cyclic pitch input device 23, or the tail rotor input device 24, then the gas turbine engines 60, 62 reject the disturbance (that is, the change to the power demand) by pulling more power on. As will be discussed below in more detail, feed-forward control systems in accordance with aspects of the present disclosure may be used to anticipate these types of disturbances and, as a result, improve maneuverability of the aircraft 10.

It should also be appreciated that, although a particular aircraft has been illustrated and described, other configurations and/or aircraft, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

Figure 2:
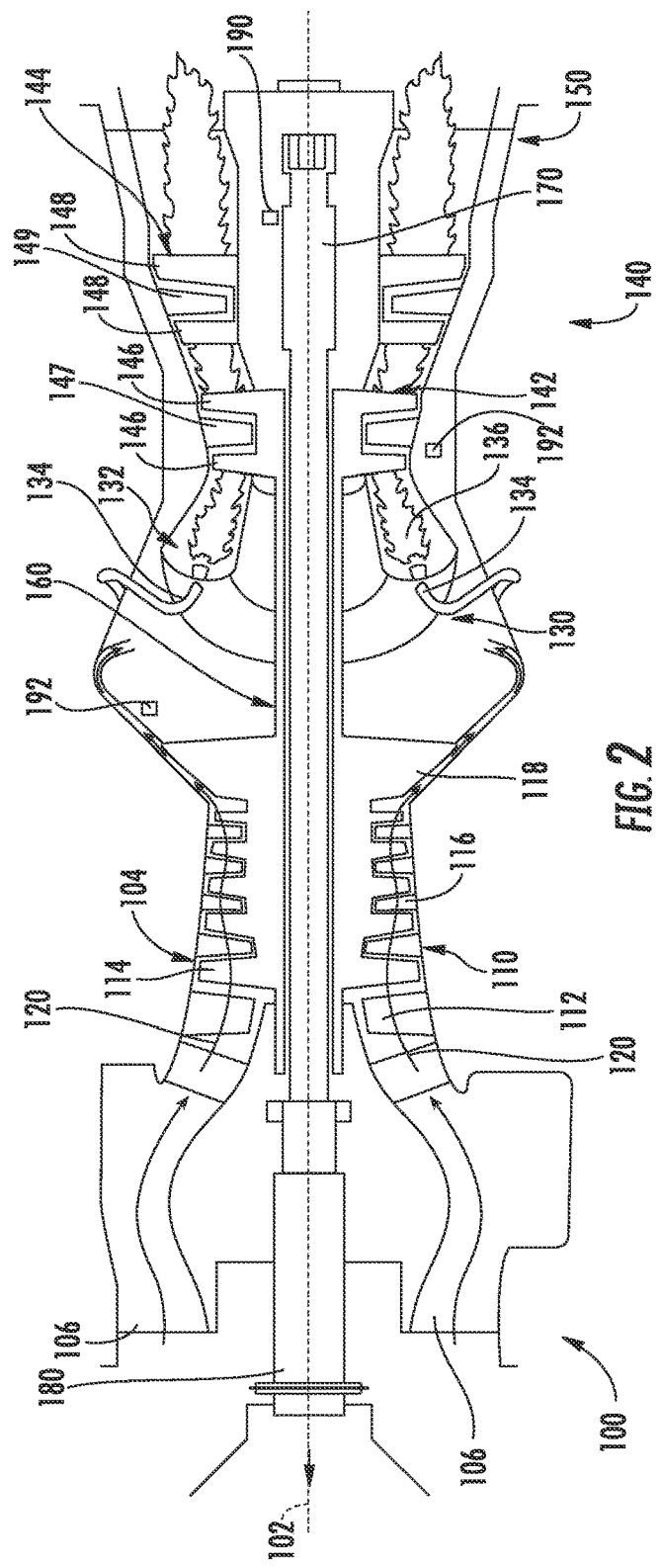
FIG. 2 is a schematic cross-sectional view of a gas turbine engine in accordance with one embodiment of the present disclosure.

FIG. 2 provides a schematic cross-sectional view of an exemplary gas turbine engine 100 in accordance with the present disclosure. As shown in FIG. 2, the gas turbine engine 100 defines a longitudinal or centerline axis 102 extending through for reference. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine section 140, and an exhaust section 150. The gas generator compressor 110 includes an annular array of inlet guide vanes 112, one or more sequential stages of compressor blades 114, one or more sequential stages of stationary and/or variable guide vanes 116, and a centrifugal compressor 118. Collectively, the compressor blades 114, vanes 116, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine 140.

The turbine section 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. Additionally, the gas generator turbine 142 drives the gas generator compressor 110 via a gas generator shaft 160, and the power turbine 144 drives an output shaft 180 via a power turbine shaft 170.

More specifically, as is shown in the embodiment illustrated in FIG. 2, the gas generator compressor 110 and the gas generator turbine 142 are coupled to one another via the gas generator shaft 160, and the power turbine 144 and the output shaft 180 are coupled to one another via the power turbine shaft 170. In operation, the combustion gases 136 drive both the gas generator turbine 142 and the power turbine 144. As the gas generator turbine 142 rotates around the centerline axis 102, the gas generator compressor 110 and the gas generator shaft 160 both also rotate around the centerline axis 102. Further, as the power turbine 144 rotates, the power turbine shaft 170 rotates and transfers rotational energy to the output shaft 180. As an example, the gas turbine engine 100 may be the first and second gas turbine engines 60, 62 of FIG. 1, and the output shaft 180 may rotate both the main and tail rotor blades 44, 54 of the aircraft 10.

Still referring to FIG. 2, the gas turbine engine 100 also includes a first sensor 190 and a second sensor 192. In one exemplary embodiment, the first sensor 190 may be configured to sense information indicative of a rotational speed $N_P$ of the power turbine shaft 170. However, in alternative embodiments, the first sensor 190 may be configured to sensor information indicative of a rotational speed $N_R$ of the output shaft 180. The second sensor 192 may be configured as at least one of a pressure sensor or a temperature sensor. For example, in one exemplary embodiment, the second sensor 192 may be a temperature sensor configured to sense information indicative of a turbine gas temperature $T_{4.5}$ of the gas turbine engine 100. Alternatively, or in addition to, the second sensor 192 may be a pressure sensor configured to sense information indicative of a compressor discharge pressure $P_{S3}$ of the gas turbine engine 100.

Referring briefly now to FIGS. 1 and 2, it should be appreciated, that in at least certain exemplary embodiments, one or both of the first and second gas turbine engines 60, 62 of the aircraft 10 in FIG. 1 may be configured in substantially the same manner as the gas turbine engine 100 depicted in FIG. 2. In addition, the first and second gas turbine engines 60, 62 may be mechanically coupled to one another such that the first and second gas turbine engines 60, 62 operate together. For example, the first and second gas turbine engines 60, 62 may be ganged together in a gearbox by, e.g., differentials and one-way clutches (such as sprag clutches), such that they operate together.

It should be appreciated, however, that in other exemplary embodiments, the gas turbine engine of FIG. 2 may instead have any other suitable configuration. For example, in other exemplary embodiments, the combustion section 130 may include a reverse flow combustor. Additionally, in still other exemplary embodiments, the gas turbine engine 100 may not be configured as a dual spool machine, and instead may include a common shaft configured to couple the compressor, the turbine, and the output shaft.

Figure 3:
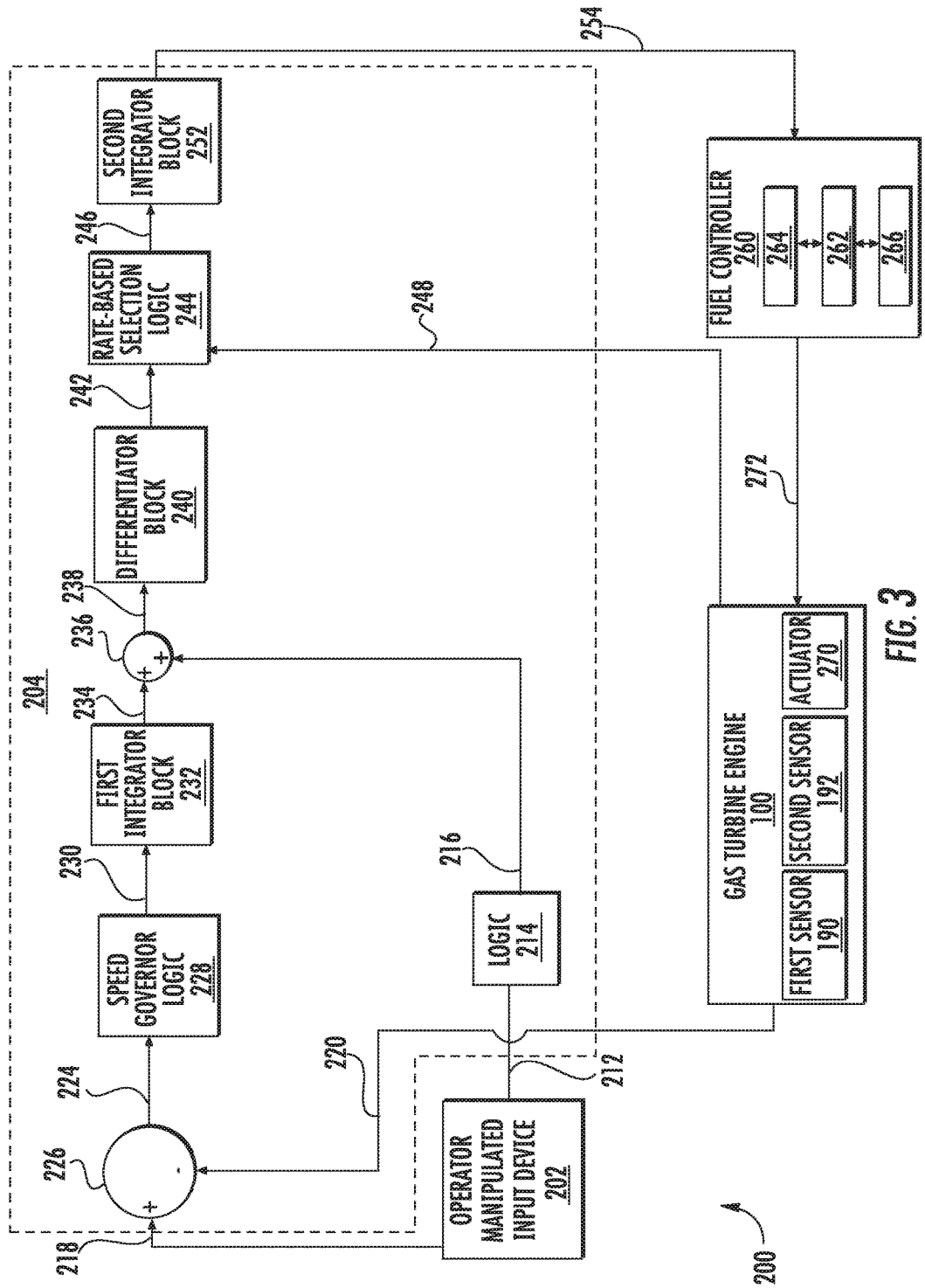
FIG. 3 is a illustrates a schematic view of a system for controlling the operation of a gas turbine engine in accordance with one embodiment of the present subject matter.

Referring now to FIG. 3, one embodiment of a system 200 for controlling a fuel flow demand of a gas turbine engine of an aircraft is illustrated in accordance with aspects of the present subject matter. In general, the system 200 will be described with reference to the aircraft 10 and the gas turbine engine 100 described above with reference to FIGS. 1 and 2. However, in other embodiments, the system 200 may be implemented or used in association with any other suitable gas turbine engine.

As shown in FIG. 3, the system 200 may include an operator manipulated input device 202 of the aircraft 10. In some exemplary embodiments, the operator manipulated input device 202 may be configured to generate a non-rate based signal in response to manipulation thereof by an operator of the aircraft 10. For example, the operator manipulated input device 202 may comprise at least one of the collective pitch input device 22, the cyclic pitch input device 23, and the tail rotor input device 24. More specifically, in one exemplary embodiment, the operator manipulated input device 202 may be the collective pitch input device 22. As such, the collective pitch input device 22 may be configured to generate the non-rate based signal in response to manipulation thereof to, e.g., increase or decrease the vertical lift of the aircraft 10. Alternatively, or in addition to, one or both of the cyclic pitch input device 23 and the tail rotor input device 24 may be configured to generate the non-rate based signal in response to manipulation thereof. Moreover, as discussed in greater detail below, in still other exemplary aspects, the non-rate based signal may be derived from one or more sensors of the aircraft 10, such as by one or more inertial sensors of the aircraft 10.

Figure 4:
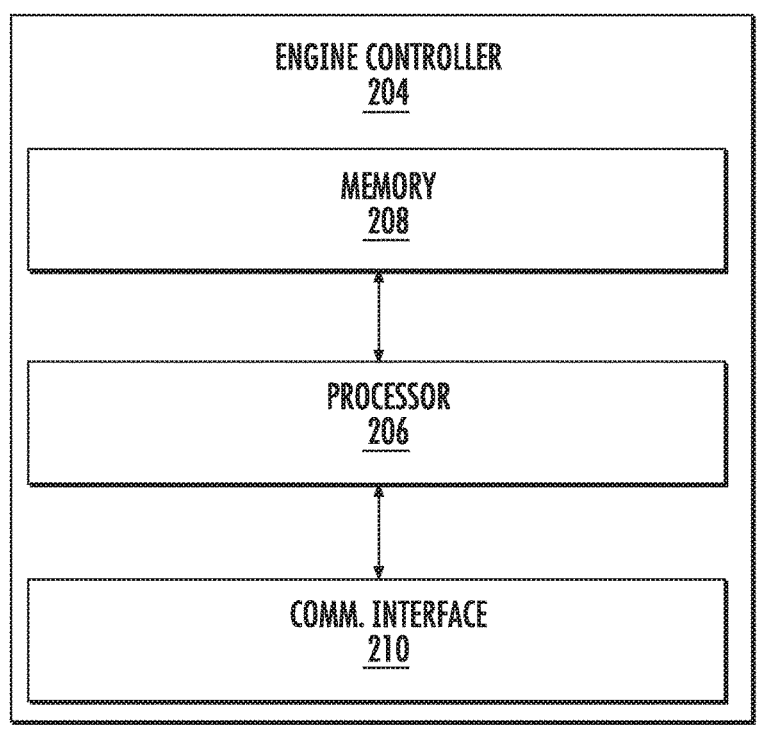
FIG. 4 illustrates a block diagram of one embodiment of an exemplary controller that may be used within the system of FIG. 3.

The system 200 may also include an engine controller 204. In general, the engine controller 204 may correspond to any suitable processor-based device, including one or more computing devices. For instance, referring now briefly to FIG. 4, one embodiment of suitable components that may be included within the engine controller 204. As shown in FIG. 4, the engine controller 204 may include a processor 206 and associated memory 208 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 208 may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. The memory 208 may store instructions that, when executed by the processor 206, cause the processor 206 to perform functions (e.g., the method described herein).

As shown in FIG. 4, the engine controller 204 also includes a communications interface module 210. In several embodiments, the communications interface module 210 includes associated electronic circuitry that is used to send and receive data. As such, the communications interface module 210 of the engine controller 204 may be used to receive data from the input device 202. In addition, the communications interface module 210 may also be used to communicate with any other suitable components of the gas turbine engine 100, including any number of sensors configured to monitor one or more operating parameters of the gas turbine engine 100. It should be appreciated that the communications interface module 210 may be any combination of suitable wired and/or wireless communications interfaces and, thus, may be communicatively coupled to one or more sensors of the gas turbine engine 100 via a wired and/or wireless connection.

Referring back to FIG. 3, the engine controller 204 receives an operator command 212 from the operator manipulated input device 202 of the aircraft 10. More specifically, in one exemplary embodiment, the operator manipulated input device 202 is the collective pitch input device 22. Thus, in such an embodiment, the engine controller 204 receives the operator command 212 from the collective pitch input device 22, and the operator command 212 is a non-rate based signal. For example, the collective pitch input device 22 may be a lever, and the operator command 212 may comprise data indicating an angular position of the collective input device 22 (i.e., the lever) relative to a reference position.

The engine controller 204 includes logic 214 that is configured to determine a control initiated fuel flow demand 216 that is based, at least in part, on the operator command 212. More specifically, the logic 214 may include a look-up table comprising a first set of values and a second set of values. Each value in the first set may correspond to the operator command 212 received from the operator manipulated input device 202. Each value in the second set may be a corresponding control initiated fuel flow demand 216. As such, the engine controller 210 may be configured to select a first value from the first set of values based, at least in part, on the operator command 212. The engine controller 210 may then determine the corresponding value for the control initiated fuel flow demand 216 based, at least in part, on the selected first value. It should be appreciated that the control initiated fuel flow demand 216 is a non-rate based fuel signal. For example, the control initiated fuel flow demand 216 may indicate an amount of fuel that is converted to power.

Referring still to FIG. 3, the engine controller 204 also receives a first signal 218 indicating a reference speed of the gas turbine engine 100, and a second signal 220 indicating an actual speed of the gas turbine engine 100. For the embodiment depicted, the first signal 218 is generated by the operator via the operator manipulated input device 202 as a standalone value. The second signal 220 is generated by the first sensor 190 of the gas turbine engine 100. More specifically, an operator of the aircraft 10 may manipulate the operator manipulated input device 202 (e.g., the collective pitch input device 22, the cyclic input device 23, or the tail rotor input device 24) to set the reference power (i.e., the aircraft load), and the first sensor 190 may be a speed sensor configured to sense information indicative of a rotational speed $N_P$ of the power turbine shaft 170 which, as mentioned above, is mechanically coupled to the ganged power turbines 144. As will be discussed below in more detail, the second signal 220 may change over time due to disturbances to the gas turbine engine 100, which may be necessitated by changes to the power demand of the aircraft 10 during transient operation (e.g., acceleration, deceleration, etc.) of the aircraft 10. Additionally, in other exemplary aspects, the first signal 218 may instead be derived from one or more sensors of the aircraft 10, such as from one or more inertial sensors.

The engine controller 204 is configured to determine a tracking error 224 introduced by the disturbance, the tracking error 224 being a differential measurement between the first signal 218 and the second signal 220. More specifically, the engine controller 204 may determine the tracking error 224 by subtracting the second signal 220 from the first signal 218 (e.g., via a differential block 226). In some exemplary embodiments, the tracking error 224 may indicate a speed error between the reference speed of the gas turbine engine 100 and the actual speed of the gas turbine engine 100. As will be discussed below in more detail, the engine controller 204 may increase or decrease the power of the gas turbine engine 100 based, at least in part, on the tracking error 224.

The engine controller 204 includes speed governor logic 228 that, when executed, converts the tracking error 224 to a first rate of change of fuel flow demand 230. More specifically, the speed governor logic 228 may include a look-up table comprising a first set of values and a second set of values. Each value in the first set may correspond to the tracking error 224. Each value in the second set may be a corresponding first rate of change of fuel flow demand 230. As such, the engine controller 204 may, when executing the speed governor logic 228, select a first value from the first set of values based on the tracking error 224. The engine controller 204 may then determine the corresponding value for the first rate of change of fuel flow demand 230 based on the selected first value. It should be appreciated, however, that the speed governor logic 228 may include any suitable logic to determine the first rate of change of fuel flow demand 230.

The engine controller 204 may be further configured to integrate the first rate of change of fuel flow demand 230. More specifically, the engine controller 210 includes a first integrator block 232 that integrates the first rate of change of fuel flow demand 230. Thus, the first rate of change of fuel flow demand 230 becomes a tracking error fuel flow demand 234. It should be appreciated that the tracking error fuel flow demand 234 is a non-rate based fuel signal. For example, in certain embodiments, the tracking error fuel flow demand 234 may be an amount of fuel.

The engine controller 204 is further configured to sum the control initiated fuel flow demand 216 and the tracking error fuel flow demand 234 (e.g., via a summing block 236) to determine a composite fuel flow demand 238. It should be appreciated that the composite fuel flow demand 238 is also a non-rate based fuel signal. Additionally, for the embodiment depicted, the engine controller 204 is further configured to differentiate the composite fuel flow demand 238. More specifically, the engine controller 204 includes a differentiator block 240 that differentiates the composite fuel flow demand 238. Thus, the differentiator block 240 converts the composite fuel flow demand 238 to a second rate of change of fuel flow demand 242.

As shown in FIG. 3, the engine controller 204 includes rate-based selection logic 244 that determines a third rate of change of fuel flow demand 246. More specifically, the rate-based selection logic 244 may include a look-up table comprising a first set of values and a second set of values. Each value in the first set may correspond to the second rate of change of fuel flow demand 242, and each value in the second set may be a corresponding third rate of change of fuel flow demand 246. As such, the engine controller 204 may, when executing the rate-based selection logic 244, select a first value from the first table of values based on the second rate of change of fuel flow demand 242. The engine controller 204 may then determine the corresponding value for the third rate of change of fuel flow demand 246 from the second set based on the selected first value.

It should also be appreciated that, in some exemplary embodiments, the engine controller 204 may determine the third rate of change of fuel flow demand 246 based on other data beyond the second rate of change of fuel flow demand 242. For example, the engine controller 210 is, for the embodiment depicted, configured to receive data 248 from the second sensor 192 of the gas turbine engine 100, and the engine controller 204 may be further configured to determine the third rate of change of fuel flow demand 246 as a function of both the second rate of change of fuel flow demand 242 and the data 248 received from the second sensor 192. More specifically, in one exemplary embodiment, the second sensor 192 may be a pressure sensor configured to detect a compressor discharge pressure $P_{S3}$ of the gas generator compressor 110. Alternatively, or in addition to, the second sensor 192 may be a temperature sensor configured to detect a turbine inlet temperature $T_{4.5}$ within the turbine section 140 of the gas turbine engine 100.

The engine controller 204 is, for the embodiment depicted, configured to integrate the third rate of change of fuel flow demand 246. More specifically, the engine controller 204 includes a second integrator block 252 that integrates the third rate of change of fuel flow demand 246. Thus, the third rate of change of fuel flow demand 246 becomes a resultant fuel flow demand 254. It should be appreciated that the resultant fuel flow demand 254 is also a non-rate based fuel signal. As will be discussed below in more detail, the resultant fuel flow demand 254 may be utilized to increase or decrease the fuel flow of the gas turbine engine 100.

The system 200 also includes a fuel controller 260. As shown, the fuel controller 260 includes one or more processor(s) 262 and associated memory 264 configured to perform a variety of computer-implemented functions. The fuel controller 260 may also include a communications interface module 266. As such, the communications interface module 266 of the fuel controller 260 may be communicatively coupled to the communications interface module 210 of the engine controller 204 to enable communications between the engine controller 204 and the fuel controller 260. Thus, as is depicted for the embodiment of FIG. 3, the fuel controller 260 receives the resultant fuel flow demand 254 from the engine controller 204. Furthermore, as will be discussed below in more detail, the fuel controller 260 may increase or decrease the amount of fuel flowing into the combustion chamber 132 of the gas turbine engine 100 based on the resultant fuel flow demand 254.

As shown, the fuel controller 260 is in communication with an actuator 270 of the gas turbine engine 100. In one exemplary embodiment, the actuator 270 is a fuel metering value configured to increase or decrease the fuel flow of the gas turbine engine 100 based, at least in part, on a fuel flow demand signal 272 received from the fuel controller 260. More specifically, the fuel flow demand signal 272 is based, at least in part, on the resultant fuel flow demand 254 determined by the engine controller 204. It should be appreciated, however, that in other exemplary embodiments, the actuator 270 may not be included within the gas turbine engine 100, and instead may be located at any other suitable location.

Figure 5:
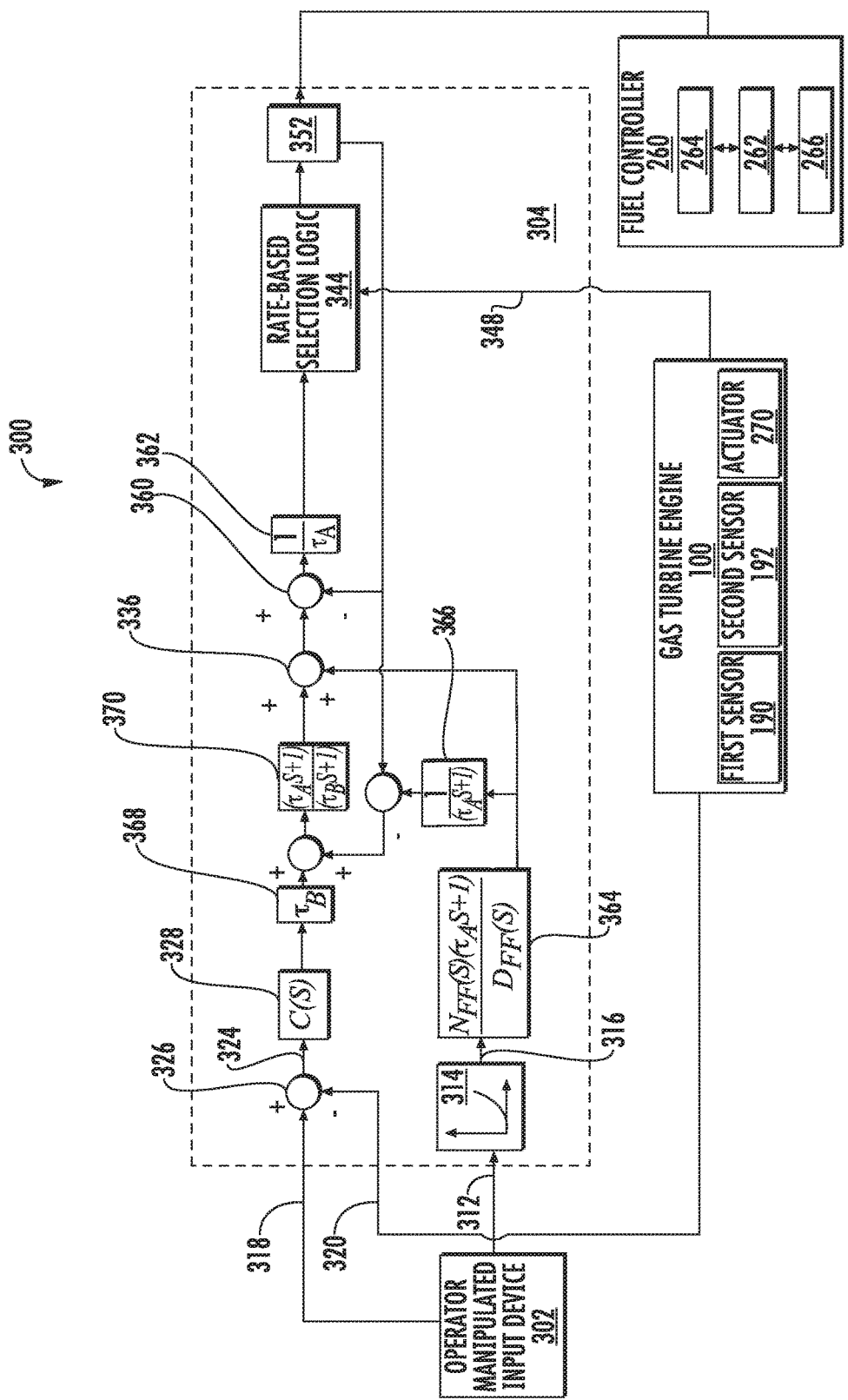
FIG. 5 illustrates the system of FIG. 3 in accordance with another embodiment of the present subject matter.

Referring now to FIG. 5, a schematic block diagram is provided of a system 300 in accordance with an exemplary embodiment of the present disclosure. The exemplary system 300 may function in essentially the same manner as exemplary system 200 described above with reference to FIG. 3. More specifically, a person having ordinary skill in the art will appreciate that the exemplary system 300 is one, more specific embodiment of the exemplary system 200 described above with reference to FIG. 3.

Similar to the exemplary system 200 of FIG. 3, the exemplary system 300 of FIG. 5 includes an operator manipulated input device 302 operably connected to an engine controller 304. The operator manipulated input device 302 may be at least one of the collective input device 22, the cyclic input device 23, and the tail rotor input device 24. Broadly speaking, the engine controller 304 includes logic 314 configured to receive an operator command 312 from the operator manipulated input device 302, and convert the operator command 312 into a control initiated fuel flow demand 316.

Simultaneously, the engine controller 304 is configured to determine a tracking error 324 at summation block 326. The tracking error 324 may be determined by subtracting an actual rotor speed 320 from a reference, or desired, rotor speed 318. The reference and actual rotor speeds 318, 320 may be indicative of rotor speeds of a main rotor of a helicopter, or alternatively, may be rotor speeds of a gas turbine engine, such as gas turbine engine 100. The tracking error 324 determined at summation block 326 is provided to speed governor logic 328 of the engine controller 304 to determine a fuel demand in the form of a fuel rate (i.e., an amount of fuel per unit time). As will be explained in greater detail below, the fuel demand is converted into a non-rate based fuel demand signal (i.e., an amount of fuel) and summed with the control initiated fuel flow demand 316 determined, at least in part, using the logic 314 (also in the form of a non-rate based fuel demand/an amount of fuel) at summation block 336 to determine a composite fuel flow demand.

The composite fuel flow demand from summation block 336 may then be processed through a lag network that determines a fuel flow provided to the gas turbine engine 100. A lag network refers to a summation block, an integrator block, and a gain block combination. The lag network for the embodiment depicted includes a summation block 360, a gain block 362, and an integrator block 352. Notably, a rate based selection logic 344 is within the lag network for the embodiment depicted to provide control for other governors of the gas turbine engine (e.g., engine 100), such as turbine temperature governors, rotational speed governors, etc. The value from integrator block 352 is fed back to summation block 360 to create the lag network. The system 300 includes time constants, $\tau_A$ and $\tau_B$, present in various lag functions and lead functions, respectively, to shape the response and remove any dynamic artifacts (or frequency warping) caused by the arrangement of blocks.

Further, it will be appreciated, that the lag added by gain block 362 and summing block 360 is accounted for elsewhere in the exemplary system 300. For example, the control initiated fuel flow demand 316 from logic 314 is provided through a power to fuel compensation network 364 including a lead function (e.g., for the embodiment depicted, "$(\tau_A s+1)$"). It will be appreciated that the power to fuel compensation network 364 is a transfer function configured to compensate for the engine (e.g., engine 100), or more particularly, to reduce or eliminate engine dynamics. However, the power to fuel compensation network 364 may also reduce or eliminate any other dynamics to which the system 300 may be susceptible. Accordingly, the power to fuel compensation network 364 normalizes the system 300 for an aircraft interface. Additionally, the lag added by gain block 362 is accounted for by a lag block 366, a gain block 368, and a lead-lag/lead network block 370.

In general, the control system 300 of FIG. 5 closes a loop around the integrator block 352 and, as a result, creates a static power demand interface without the need for rate calculation and memory. The various blocks previously described are configured to eliminate any dynamic artifacts caused by these operations. It will be appreciated that in other exemplary aspects of the present disclosure, the "outer speed loop" may be closed by blocks 328, 368, 326, 318, and 320 in any suitable manner.

Figure 6:
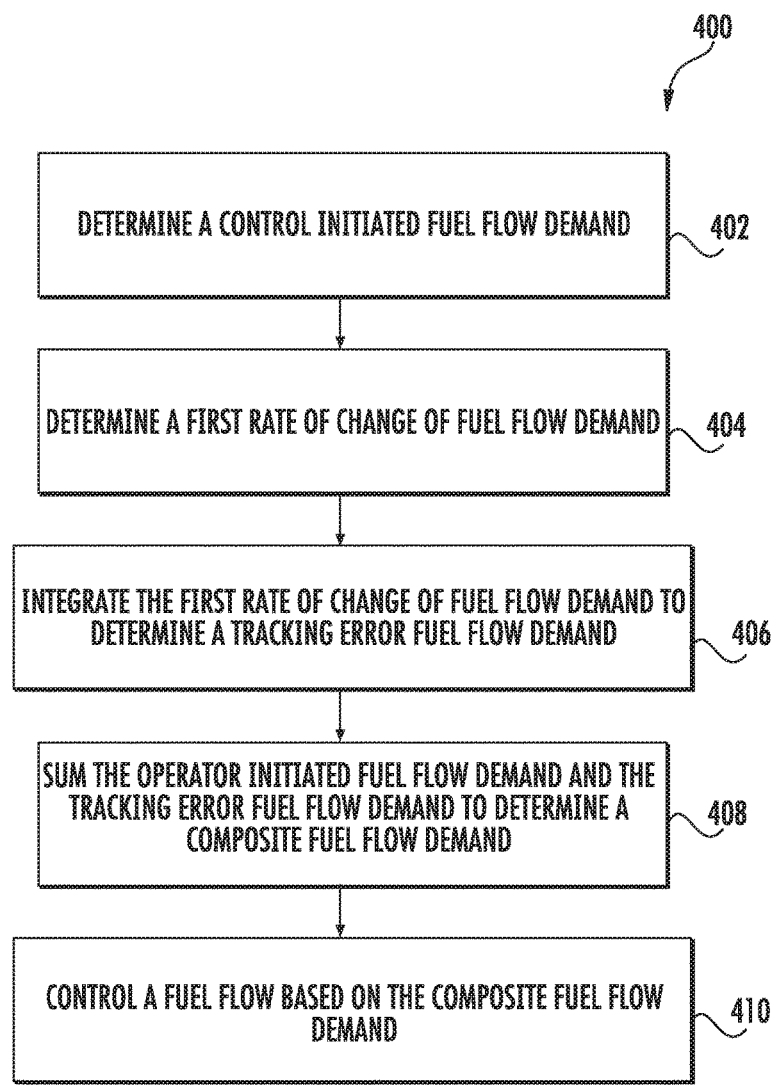
FIG. 6 illustrates a flow diagram of one embodiment of a method for controlling the operation of a gas turbine engine in accordance with aspects of the present subject matter.

Referring now to FIG. 6, a flow diagram of one embodiment of a computer-implemented method 400 for controlling a fuel flow provided to a gas turbine engine of an aircraft is illustrated in accordance with aspects of the present subject matter. In general, the method 400 will be discussed herein with reference to the system(s) described above with reference to FIGS. 3-5 along with the aircraft 10 and gas turbine engine 100 discussed above with reference to FIGS. 1 and 2. However, it should be appreciated that the disclosed method 400 may generally be implemented with gas turbine engines having any other suitable engine configuration and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method (400) includes determining, by one or more controllers, a control initiated fuel flow demand based, at least in part, on an operator command. Specifically, in some exemplary embodiments, the one or more controllers may receive the operator command from an operator manipulated input device of the aircraft. For example, in one embodiment, the one or more controllers may be configured to determine the control initiated fuel flow demand based, at least in part, on an operator command received from a collective input device of the aircraft.

Additionally, at (404), the method (400) includes determining, by one or more controllers, a first rate of change of fuel flow demand based, at least in part, on a tracking error of the gas turbine engine indicating a difference between a desired rotational speed of the gas turbine engine and an actual rotational speed of the gas turbine engine. Specifically, in some exemplary embodiments, the desired rotational speed may indicate a reference speed of a main rotor of the aircraft or, alternatively, may indicate a reference speed of a power turbine shaft of the gas turbine engine. Likewise, the actual rotational speed may indicate an actual speed of the main rotor or, alternatively, may indicate an actual speed of the power turbine shaft.

At (406), the method (400) includes integrating, by the one or more controllers, the first rate of change of fuel flow demand to determine a tracking error fuel flow demand. For example, in one embodiment, the one or more controllers include a first integrator block that integrates the first rate of change of fuel flow demand to determine the tracking error fuel flow demand.

At (408), the method (400) includes summing, by the one or more controllers, the control initiated fuel flow demand and tracking error fuel flow demand to determine a composite fuel flow demand. Specifically, in one embodiment, the one or more controllers include a summation block that sums the control initiated fuel flow demand and tracking error fuel flow demand to determine the composite fuel flow demand.

In addition, at (410), the method (400) includes controlling, by the one or more controllers, a fuel flow to the gas turbine engine based, at least in part, on the composite fuel flow demand. Specifically, in some exemplary embodiments, controlling the fuel flow based, at least in part, on the composite fuel flow demand includes controlling the fuel flow to the gas turbine engine based, at least in part, on a modification of the composite fuel flow demand using a lag network. More specifically, controlling the fuel flow to the gas turbine engine based, at least in part, on the modification of the composite fuel flow demand includes introducing a lag using a lag network (e.g., see lag introduced using lag network 362), and compensating the lag introduced by the lag network at least in part using a lead-lag network (e.g., see lead-lag network introduced using lead-lag/lead network block 370).

It should be appreciated that the exemplary method (400) described with reference to FIG. 6, and the exemplary systems 200, 300 depicted in and described with reference to FIGS. 3 and 5, are each configured to utilize "operator inputs". For example, the "control initiated fuel flow demand" 216, 316 are each described above as being based off an operator manipulated input device. Further, the "first signal" 218, 318 indicating a reference speed of the gas turbine engine is derived from an operator manipulated input device. It should be appreciated, however, that in other exemplary aspects of the present disclosure, at least one of these signals may instead be derived from information collected or determined on the aircraft 10. For example, in alternative aspects of the present disclosure, at least one of the control initiated fuel flow demand 216, 316 or first signal 218, 318 may be derived from inertial sensor(s) on the aircraft 10, which may determine information such as a g-load on the aircraft 10 to determine actual power needs of the aircraft 10.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for controlling a fuel flow to a gas turbine engine of an aircraft, the method comprising:
   determining, by one or more controllers, a control initiated fuel flow demand based, at least in part, on an operator command, wherein the operating command is a non-rate based signal generated in response to manipulation of at least one of a collective pitch input device, the cyclic pitch input device, and a tail rotor input device of the aircraft;
   determining, by the one or more controllers, a first rate of change of fuel flow demand based, at least in part, on a tracking error of the gas turbine engine indicating a difference between a desired rotational speed and an actual rotational speed;
   integrating, by the one or more controllers, the first rate of change of fuel flow demand to determine a tracking error fuel flow demand;
   summing, by the one or more controllers, the control initiated fuel flow demand and the tracking error fuel flow demand to determine a composite fuel flow demand; and
   controlling, by the one or more controllers, a fuel flow to the gas turbine engine based, at least in part, on the composite fuel flow demand.

2. The computer-implemented method of claim 1, wherein controlling the fuel flow to the gas turbine engine based, at least in part, on the composite fuel flow demand comprises:
   differentiating, by the one or more controllers, the composite fuel flow demand to determine a second rate of change of fuel flow demand; and
   determining, by the one or more controllers, a third rate of change of fuel flow demand based, at least in part, on the second rate of change of fuel flow demand.

3. The computer-implemented method of claim 2, wherein the third rate of change of fuel flow demand is different than the second rate of change of fuel flow demand.

4. The computer-implemented method of claim 2, wherein controlling the fuel flow to the gas turbine engine based, at least in part, on the composite fuel flow demand further comprises:
   integrating, by the one or more controllers, the third rate of change of fuel flow demand to determine a resultant fuel flow demand; and
   controlling, by the one or more controllers, the fuel flow of the gas turbine engine to match the resultant fuel flow demand.

5. The computer-implemented method of claim 4, wherein the control initiated fuel flow demand, tracking error fuel flow demand, composite fuel flow demand, and resultant fuel flow demand are each non-rate based fuel signals.

6. The computer-implemented method of claim 2, wherein determining the third rate of change of fuel flow demand further comprises determining the third rate of change of fuel flow demand based, at least in part, on the second rate of change of fuel flow demand and an operating parameter of the gas turbine engine.

7. The computer-implemented method of claim 6, wherein determining the third rate of change of fuel flow demand based, at least in part, on the second rate of change of fuel flow demand and the operating parameter of the gas turbine engine comprises determining the operating parameter based on data received from a sensor of the gas turbine engine.

8. The computer-implemented method of claim 7, wherein the sensor includes at least one of a temperature sensor and a pressure sensor.

9. The computer-implemented method of claim 8, wherein the sensor includes the temperature sensor, and wherein the temperature sensor senses information indicative of a turbine gas temperature of the gas turbine engine.

10. The computer-implemented method of claim 8, wherein the sensor includes the pressure sensor, and wherein the pressure sensor senses information indicative of a compressor discharge pressure of the gas turbine engine.

11. The computer-implemented method of claim 1, wherein determining the control initiated fuel flow demand based, at least in part, on the operator command comprises receiving the operator command from an operator manipulated input device of the aircraft, wherein the operator manipulated input device comprises a collective input device.

12. The computer-implemented method of claim 1, wherein controlling the fuel flow to the gas turbine engine based, at least in part, on the composite fuel flow demand comprises controlling the fuel flow to the gas turbine engine based, at least in part, on a modification of the composite fuel flow demand using a lag network.

13. The computer-implemented method of claim 1, wherein the gas turbine engine includes a power turbine shaft, wherein the desired rotational speed indicates a reference speed of the power turbine shaft, and wherein the actual rotational speed indicates an actual speed of the power turbine shaft.

14. A system for controlling a fuel flow to a gas turbine engine of an aircraft, the system comprising:
   one or more processors; and
   one or more memory devices, the one or more memory devices storing computer-readable instructions that, when executed by the one or more processors, cause the one or more processors to perform operations, the operations comprising:
      determining a control initiated fuel flow demand based, at least in part, on an operator command;
      determining a first rate of change of fuel flow demand based, at least in part, on a tracking error of the gas turbine engine indicating a difference between a desired rotational speed and an actual rotational speed;

integrating the first rate of change of fuel flow demand to determine a tracking error fuel flow demand;

summing the control initiated fuel flow demand and the tracking error fuel flow demand to determine a composite fuel flow demand; and controlling a fuel flow to the gas turbine engine based, at least in part, on a modification of the composite fuel flow demand using a lag network.

15. The system of claim 14, wherein controlling the fuel flow to the gas turbine engine based, at least in part, on the composite fuel flow demand comprises:

differentiating, by the one or more controllers, the composite fuel flow demand to determine a second rate of change of fuel flow demand; and determining, by the one or more controllers, a third rate of change of fuel flow demand based, at least in part, on the second rate of change of fuel flow demand.

16. The system of claim 15, wherein the third rate of change of fuel flow demand is different than the second rate of change of fuel flow demand.

17. The system of claim 15, wherein controlling the fuel flow to the gas turbine engine based, at least in part, on the composite fuel flow demand further comprises:

integrating, by the one or more controllers, the third rate of change of fuel flow demand to determine a resultant fuel flow demand; and controlling, by the one or more controllers, the fuel flow of the gas turbine engine to match the resultant fuel flow demand.

18. The system of claim 15, wherein determining the third rate of change of fuel flow demand further comprises determining the third rate of change of fuel flow demand based, at least in part, on the second rate of change of fuel flow demand and an operating parameter of the gas turbine engine, and wherein the operating parameter is determined based on data received from a sensor of the gas turbine engine.

19. The system of claim 14, wherein controlling the fuel flow to the gas turbine engine based, at least in part, on the modification of the composite fuel flow demand includes introducing a lag using a lag network, and compensating for the lag at least in part using a lead-lag network.

20. The system of claim 14, wherein the lag network comprises a summation block, an integrator block, and a gain block combination.

* * * * *